United States Patent [19]

Arnett

[11] Patent Number: 5,600,746
[45] Date of Patent: Feb. 4, 1997

[54] PATCH PANEL AND COLLAR FOR OPTICAL FIBER COUPLERS

[75] Inventor: Jaime R. Arnett, Fishers, Ind.

[73] Assignee: Lucent Technologies Inc., Murray Hill, N.J.

[21] Appl. No.: 395,736

[22] Filed: Feb. 28, 1995

[51] Int. Cl.⁶ .................................................. G02B 6/36
[52] U.S. Cl. .............................. 385/53; 385/76; 385/134
[58] Field of Search ................................. 385/53, 55, 56, 385/70, 76, 77, 134–139

[56] References Cited

U.S. PATENT DOCUMENTS

| | | | |
|---|---|---|---|
| 4,372,511 | 2/1983 | Knowles | 248/68.1 |
| 4,787,706 | 11/1988 | Cannon, Jr. et al. | 385/59 |
| 5,041,018 | 8/1991 | Arnett | 439/536 |
| 5,096,439 | 3/1992 | Arnett | 439/536 |
| 5,129,023 | 7/1992 | Anderson et al. | 385/70 |
| 5,142,597 | 8/1992 | Mulholland et al. | 385/56 |
| 5,238,426 | 8/1993 | Arnett | 439/557 |
| 5,265,181 | 11/1993 | Chang | 385/53 X |
| 5,359,688 | 10/1994 | Underwood | 385/53 X |
| 5,487,123 | 1/1996 | Fowble | 385/53 X |

*Primary Examiner*—John D. Lee

[57] ABSTRACT

A patch panel having an array of openings therein and an adapter collar for mounting an optical fiber coupler in an opening. The collar has two body portions, one of which fits within the opening and the other of which buts against the front face of the panel. A coupler receiving opening extends through the body portions and has webs therein providing locking surfaces for the coupler. The collar is mounted and locked in the opening by means of cantilevered arms biased outward from the body portions, and a locking member is insertable between the arms and the body portions to prevent accidental or inadvertent release of the collar from the panel.

17 Claims, 3 Drawing Sheets

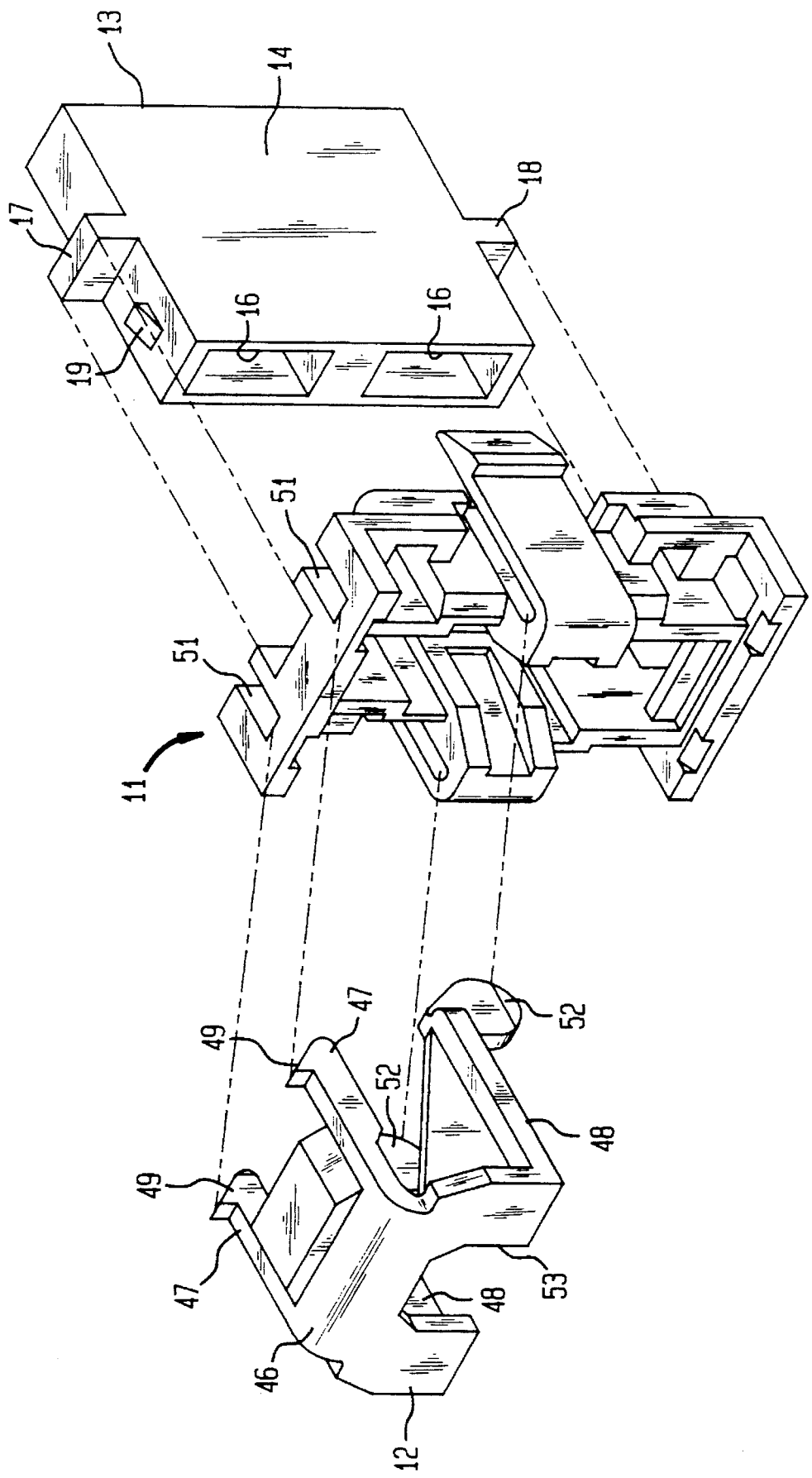

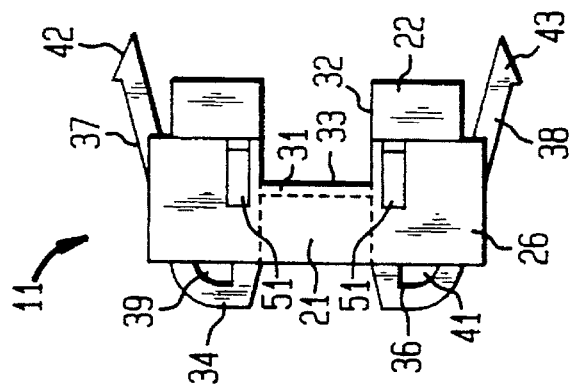
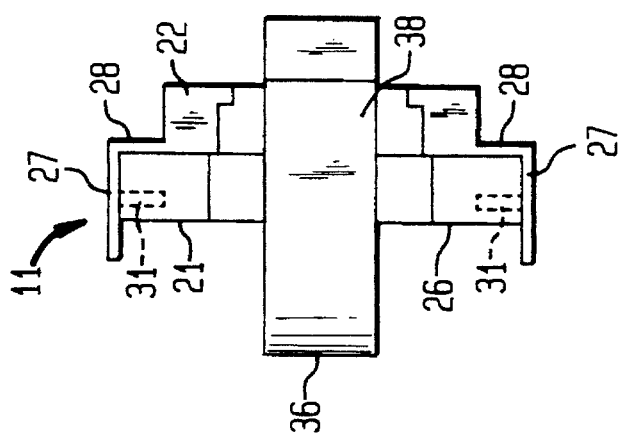
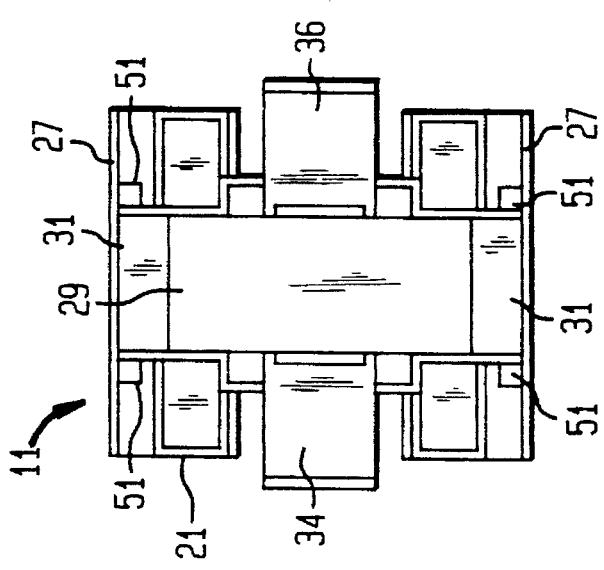

PATCH PANEL AND COLLAR FOR OPTICAL FIBER COUPLERS

FIELD OF INVENTION

This invention relates to a universal patch panel for communications use in buildings and, more particularly, to a patch panel mounting collar for mounting SC connectors to the universal panel.

BACKGROUND OF THE INVENTION

In buildings, and more particularly within communications connection closets in buildings, the various transmission media are connected to each other and to incoming and outgoing lines by means connectors mounted on patch panels. As it is most commonly configured today, a patch panel comprises a plate having arrays of openings therein, the openings usually being substantially square in shape. Thus the panel has become standardized, and numerous arrangements for mounting connectors to the panel are in use. In U.S. Pat. No. 5,238,426 of Arnett, there is shown such a patch panel and adapters for mounting connectors within the openings. As is shown in that patent, the connectors, or jacks, are generally square in shape and are intended for use with electrical signal systems. In such electrical systems, these jacks are, for the most part, standardized throughout the industry, as are the panels, themselves, with their arrays of square holes. The arrangement shown in the Arnett patent comprises a panel, a connector or jack and an adapter for mounting the connector to the panel in one of the square holes thereof. The adapter receives the connector and locks it in place by means of resilient tabs on the connector engaging front and rear surfaces of a bridging portion on the adapter. The adapter has resilient arms, each arm having two spaced wedge shaped detent members which engage the front and rear surfaces of the panel to lock the connector-adapter assembly in place. Such an arrangement allows any of a number of types of electrical connectors to be secured to the panel by securing the connector to the adapter which, in turn, is secured to the plate.

The mounting of optical fiber connectors to a panel presents numerous problems, some of which, at least, stem from the fact that there are numerous types of optical fiber connectors in use today which are incompatible with each other and which vary as to size, shape, and method of connection. Because of these variations, it is often difficult to fabricate a patch panel assembly. In U.S. Pat. No. 5,274,729 of King et al., the lack of standardization among the different types of connectors and the concomitant problems of connection are readily apparent. In the King et al. patent, a panel is formed with a plurality of different shaped holes therein for accommodating the several types of connectors, among which are the ST, SC, and FC optical connectors. Different adapters are provided for each type of connectors, each being designed to fit within one of the holes in the panel specifically shaped for the type of connector and for the particular adapter. Such an arrangement requires a panel in which the number of holes of a particular shape is limited, thereby limiting the number of one particular type of optical fiber connector that can be used with the panel.

An optical fiber connector must be capable of joining two optical fibers with a minimum of insertion loss and it must be mechanically stable and provide protection to the junction between the optical fibers. One of the most commonly used connectors which satisfies these requirements is the SC connector, the general industry acceptance of which is increasing rapidly. Such a connector, in an improved version thereof, is shown and described in U.S. Pat. No. 5,212,752 of Stephenson et al. An SC connector is connected to another SC connector through a coupler to which each SC connector is assembled by linear motion only. As shown in the Stephenson et at. patent, an SC connector includes a ferrule assembly including a barrel having a collar at one end and an optical fiber terminating ferrule projecting from the barrel. The ferrule assembly is disposed in a plug frame such that an end portion of the ferrule projects from one end of the frame. The plug frame is configured to snap lock into grip member, and the grip is inserted into one side of the coupler and locked thereto, while the corresponding grip of another SC connector is inserted into the other side of the coupler and locked. The coupler is dimensioned such that when the two connectors are inserted therein, the ends of the ferrule abut each other to form a low insertion loss optical connection. Also, the ferrules in the Stephenson et at. coupler are spring loaded to allow for slight variations in dimensions, among other things.

Because the SC connector is compact and easily installable in the field, it has become common to use a duplex coupler which is capable of optically coupling two pairs of optical fibers in a side by side arrangement, rather than using two separate couplers, thereby reducing the number of adapters required. However, at present, there is no adapter or collar for mounting a duplex coupler to a panel having the standard array of substantially square holes therein. In addition, the standard duplex SC coupler available today is designed to be snap locked into an opening in a panel, for example, that is approximately one-sixteenth of an inch thick, but the panels most commonly used today, such as the AT&T M1000 Multi-Max® panel, are approximately one-eighth of an inch thick. Thus, a collar or adapter is needed that adapts the rectangularly shaped duplex coupler to a standard one-eighth inch thick plate having an array of substantially square holes.

When the collar or adapter is snap fitted into place within a hole in the panel, there exists the unwanted possibility of an inadvertent release of the snap locks, thereby allowing the collar to fall off of the panel, or at least, out of the hole. In an electrical arrangement, this is not a serious problem, although it is undesirable. However, with optical fiber coupling, any dislocation of the coupler assembly on the panel can have serious consequences, including an interruption of service because of a disconnection. It is desirable, therefore, to lock the adapter or collar to the panel in such a way that inadvertent release of the lock or locks cannot occur.

SUMMARY OF THE INVENTION

The present invention is a collar for mounting and locking a duplex SC coupler to a standard patch panel having substantially square holes arrayed therein, such as, for example, the AT&T M1000 Multi-Max Panel®, with a collar locking arrangement for preventing inadvertent unlocking of the collar.

In a preferred embodiment thereof, the collar comprises a body of suitable rigid plastic material having a first portion dimensioned and shaped to slip fit within the opening in the panel. A second portion of the body has first and second L-shaped flanges extending therefrom which are adapted to butt against the face of the panel when the first body portion is in place within a panel opening. A continuous opening extends from front to rear of the collar through both body portions for receiving the duplex SC coupler. A web extends across the top and bottom of the opening against which flanges on the top and bottom of the coupler butt on one side of the webs and spring clips, which are standard on the duplex SC coupler, bear against the other sides of the webs to lock the coupler to the collar. First and second U-shaped cantilever arms extend from front to rear of the body on the outside thereof with their free ends adapted to fit within the panel openings and to be locked thereto by means of raised detents on their free ends.

The cantilever arms define a space between the body and the arms to allow depression of the arms toward the body for insertion of the arms within the panel opening, or for removal of the collar from the panel. To prevent accidental or inadvertent depression of the arms and, hence, possible detachment of the collar, from the panel, a locking member is provided. The locking member comprises a substantially U-shaped body having tear-drop shaped enlarged members at the free ends of one leg of the U-shaped, and detent members at the free ends of the other leg of the U-shape. At least one of the L-shaped flanges on the second body portion has first and second spaced holes for receiving the detent members, and the tear-drop shaped enlarged members are adapted to fit in the space between the cantilever arms and the body portion. Thus, when the detents are snapped into the holes in the L-shaped flange, with the enlarged members in the space between the arms and the body, the lock member is locked to the collar and the cantilever arms on the collar cannot be depressed sufficient to release the collar from the panel. As a consequence, when the collar, having the coupler locked in place, is locked within the panel opening, it cannot be inadvertently unlocked, being unlockable only by depression of the U-shaped legs, which is prevented by the locking member.

The collar of the present invention adapts the duplex SC coupler for mounting to a standard apertured panel in an expeditious manner, and the locking member insures that there will be no inadvertent release of the collar during installation and use. In addition, the body of the coupler is symmetrical as to top and bottom so that there is no necessity for the installer to worry about proper orientation of the coupler.

The principles and features of the invention will be more readily understood from the following detailed description, read in conjunction with the accompanying drawings.

DESCRIPTION OF THE DRAWINGS

FIG. 1 is an exploded perspective view of the mounting collar of the invention including the duplex coupler with which it is used and the locking member;

FIG. 2 is a front elevation view of the collar of the invention;

FIG. 3 is a side elevation view of the collar of the invention;

FIG. 4 is a top plan view of the collar of the invention; and

DETAILED DESCRIPTION

Figure 5:
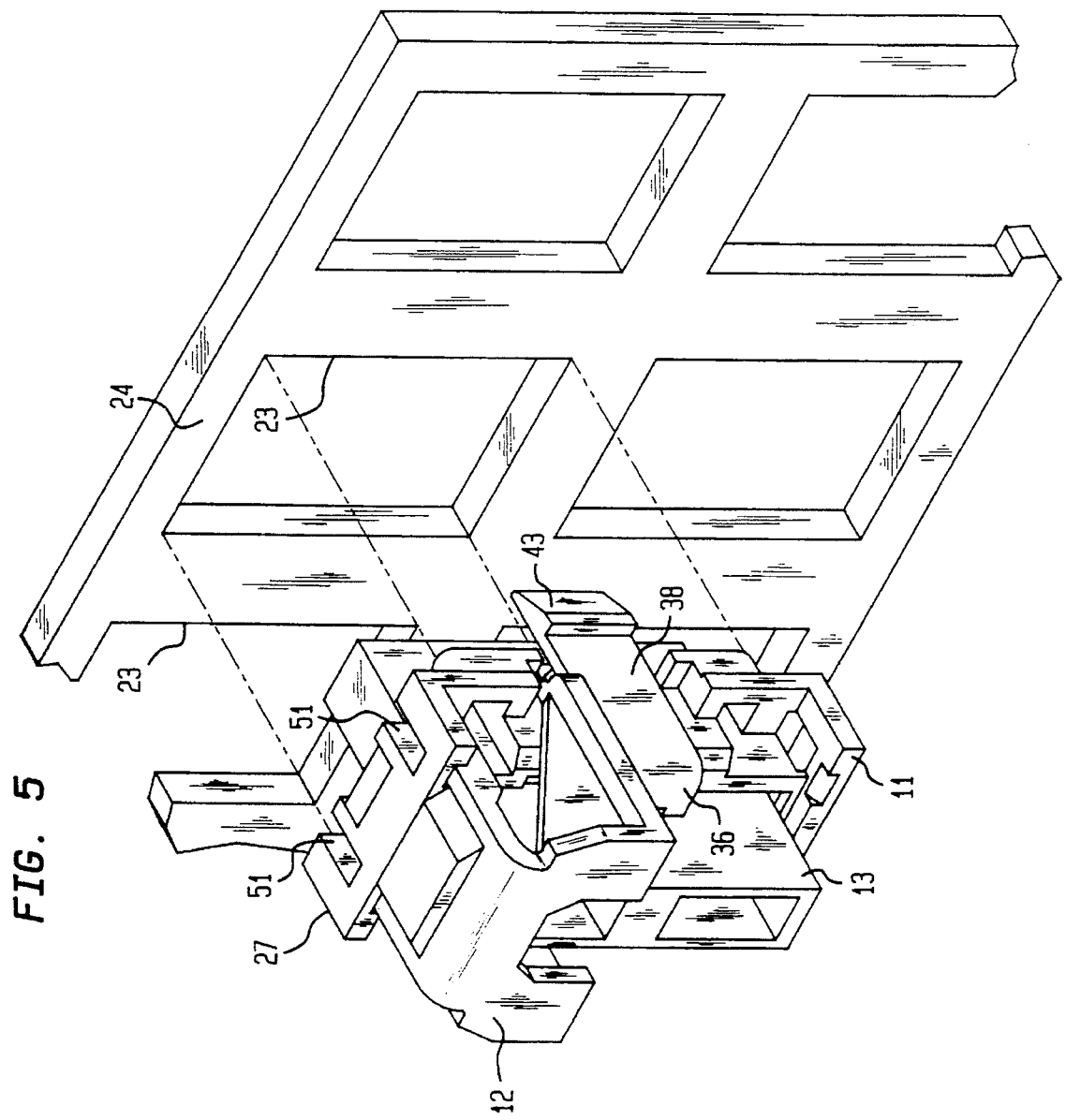
FIG. 5 is an exploded perspective view of the collar of the invention and its relationship to a standard patch panel.

In FIG. 1 there is shown an adapter collar 11 embodying the principles of the present invention, and including a locking member 12, the function of which will be discussed more fully hereinafter. The collar 11 shown in FIG. 1 is intended to function, and does so, as an adapter for mounting a C6060A-4 MM/SM Duplex Coupler (AT&T) 13, which is readily available commercially, and which is designed to couple a first pair of SC connectors end-to-end and a second pair of SC connectors end-to-end which, for clarity, have not been shown. Coupler 13 comprises a substantially rectangular body 14 of suitable plastic material having openings 16,16 at each end thereof for receiving the SC connectors to be coupled. Extending from top and bottom surfaces (as viewed in FIG. 1) of body 14 are flanges 17 and 18. The type of coupler 13 as shown in FIG. 1 is designed to engage and be affixed in openings in an approximately one-sixteenth inch plate by means of the flanges 17 and 18 bearing against one face of the plate and the ends of first and second cantilevered springs 19,19, only one of which is shown, bearing against the other face of the plate. As will be apparent hereinafter, the collar 11 of the invention adapts the coupler 13 to a panel plate approximately one-eighth of an inch thick, such as the AT&T M1000 MultiMax® panel, which is a standard thickness in the industry.

The collar 11 is shown in detail in FIGS. 2, 3 and 4. Collar 11 comprises a body 21 made of a suitable rigid plastic material having a first portion 22 having a substantially square or slightly rectangular shape dimensioned to be a slip fit within an opening 23 in the panel 24, as best seen in FIG. 5, and having an enlarged second portion 26. Portion 26 has L-shaped flanges 27,27 which form flat surfaces 28,28 adapted to bear against the front face of panel 24 when first portion 22 is inserted into the opening 23. Extending completely through the body 21 is a rectangular opening 29 which is shaped to receive coupler 13. Extending across the opening 29 at the top and bottom thereof are webs 31,31, approximately one-sixteenth of an inch thick. A recess 32 is formed in the first portion 22 of body 21 which extends partially into the second portion 26 to form a bearing surface 33 in conjunction with each web 31. When coupler 13 is inserted into opening 29, the flanges 17 and 18 thereof bear against the bearing surfaces 33,33, and hence, the rear surfaces of webs 31,31, and the ends of the cantilever springs 19,19 bear against the front surfaces of the webs 31,31 thereby locking the coupler 13 in place within collar 11. Thus, the webs 31,31 present locating and locking surfaces for the coupler.

In order that collar 11 may be locked into place within the opening 23 of plate 24, first and second substantially U-shaped cantilevered arms 34 and 36 are attached to and extend outward or forward (as viewed in FIGS. 2, 3 and 4) from body portion 21 and bend back so that one leg 37 and 38 respectively extends toward the rear of collar 11, as best seen in FIG. 4, thereby defining a gap or space 39, 41 between arms 37 and 38 and body portion 21, with the arms being biased outwardly from the body portions. The distal end of arm 37 has a wedge shaped locking detent 42 formed thereon and, in like manner, the distal end of arm 38 has a wedge shaped locking detent 43 formed thereon. When collar 11 is to be inserted within the opening 23 in plate 24, arms 37 and 38 are depressed toward the gaps 39 and 41, respectively to allow insertion of the collar. When the arms 37 and 38 are released, the detents 42 and 43 bear against the rear surface plate 24, thereby preventing the collar 11 from being pulled out of the opening 23. With the coupler 13 locked in place within collar 11, the rear surfaces of the flanges 17 and 18 and the flat surfaces 28,28 bear against the front surface of the plate, thereby preventing the collar from being pulled through the opening 23. In the absence of the coupler 13, the flat surfaces 28,28 prevent the collar 11 from being pulled through, hence, in either case, the collar 11 is securely locked to the panel 24.

As discussed hereinbefore, although the collar 11, when inserted in the opening 23 is locked in place by the arms 37 and 38 with their respective detents 42 and 43, and by surfaces 28,28, it is possible that one or both of the arms 37 and 38 could be inadvertently depressed sufficiently to unlock the collar 11 from the panel, thereby causing it to slip out of opening 23 and placing tensile strain on the SC connector/coupler junctions. Such an occurrence could possibly led to an interruption in service by compromising the integrity of the connector/coupler connection. In order that the possibility of such a mishap be negated, the collar 11 of the present invention includes a locking member 12, as best seen in FIG. 1. Member 12 comprises a substantially U-shaped (as viewed from the side) body 46 of suitable plastic material having first and second pairs of arms 47,47 and 48,48. Each of the arms 47,47 has, at the distal end thereof, a wedge shaped detent 49,49 adapted to fit within openings 51,51 in collar 11, and each of the arms 48,48 has, at the distal end thereof, a tear-drop shaped depending stop member 52,52. Body 46 also has an opening 53 therein to provide access to the openings 16,16 in coupler 13 so that SC couplers may be easily inserted and removed when the collar 11 and locking member 12 are in place.

Collar 11 is locked into place in panel 24 by insertion of the members 52,52 in the spaces 39 and 41, and locking member 12 is, itself, locked to collar 11 by means of detent members 49,49 being inserted into holes 51,51. This latter is achieved by compressing arms 47,47 toward arms 48,48 after members 52,52 have been inserted in the spaces 39 and 41 so that they may be slid under flange 27 until detents 49,49 snap into holes 51,51. The tear-drop shaped members 52,52, when inserted into spaces 39 and 41 as just described, prevent depression of arms 37 and 38 that would be sufficient to disengage detents 42 and 43, thereby insuring collar 11 against accidental disengagement from panel 24.

It can be seen from the figures that collar 11 is symmetrical, having the same configuration for receiving coupler 13 and locking member 12 both above and below arms 34 and 36. As a consequence, an installer does not have to be concerned with the orientation of collar 11 when inserting it into an opening 23 in the panel 24 so long as arms 34 and 36 are in position to engage the panel 24 at the sides of the opening 23.

FIG. 5 is a perspective view of the collar 11 with the coupler 13 mounted therein, and the locking member 12 in place, and of the plate 24 and opening 23 into which each collar fits. Although FIG. 5 shows the locking member 12 in place, it is to be understood that it is not to be inserted into position until after the collar 11 is positioned within opening 23, after which it is inserted to prevent arms 37 and 38 from being depressed, accidentally or otherwise.

The foregoing is illustrative of the present invention in a preferred embodiment thereof. The collar and locking member make possible the expeditious mounting of duplex SC couplers to a standard panel in a secure manner and substantially prevent accidental disengagement of the coupler from its position on the panel. Numerous modifications of the design of the collar and locking member, such as making them adaptable to other types of couplers, may occur to workers in the art without departure from the spirit and scope of the invention.

I claim:

1. An adaptive collar for mounting a component in an opening in a panel, said collar comprising:

a first rear body portion sized and shaped to fit within the opening;

a second front body portion sized and shaped larger than the opening and having at least one bearing surface adapted to bear against a face of the panel;

an opening for receiving the component;

means in said opening for locking the component in place within said opening;

first and second cantilevered arms extending from said second body portion at either side thereof rearwardly past said first body portion;

each of said arms being connected to said second body portion and biased outwardly therefrom to define a space between each of said arms and the body portions adjacent thereto such that when said arms are depressed toward each other said collar can be inserted into the opening until said bearing surface bears against the panel;

each of said arms having a distal end having a locking member thereon such that when the depressing forces are removed from said arms they move outwardly from said collar to cause the locking members to engage the rear of the panel adjacent the opening; and locking means for preventing the depression of said arms to disengage said locking members from the panel.

2. An adaptive collar as claimed in claim 1 wherein said locking means comprises a substantially U-shaped body having a first arm having means thereon for attaching said locking means to said collar and a second arm having a distal end having a member adapted to fit within the space between one of said cantilever arms and said body portions when said locking means is attached to said collar.

3. An adaptive collar as claimed in claim 1 wherein said locking means comprises a substantially U-shaped body portion having first and second pairs of spaced arms, each of said first pair of arms having a distal end having a detent member thereon for attaching said locking means to said collar; and each of said second pair of arms having a distal end having a stop member depending therefrom adapted to fit within the space between one of said cantilevered arms and the body portion adjacent thereto when said locking means is attached to said collar.

4. An adaptive collar assembly for mounting an optical fiber coupler in an opening in a panel, wherein the coupler has first and second flanges projecting therefrom and locking members spaced from the flanges a predetermined distance, said collar assembly comprising:

a first, rear body portion sized and shaped to fit within the opening;

a second, front body portion having top, bottom and side portions sized and shaped larger than the opening and having flange means forming bearing surfaces adapted to bear against a face of the panel;

an opening having top, bottom and side surfaces extending through said first and second body portions for receiving the coupler;

means in said opening for receiving the projecting flanges of the coupler and adapted to be engaged by the locking members on the coupler;

first and second cantilevered arms extending from said second body portion at either side thereof rearwardly past said first body portion;

each of said cantilevered arms being connected to said second body portion and biased outwardly therefrom to define a space between each of said arms and the first and second body portions adjacent thereto such that when said arms are forcibly depressed toward each other said first body portion can be inserted into the opening in the panel until said bearing surfaces bear against the panel;

each of said arms having a distal end having a locking member thereon such that when the depressing forces are removed from said arms they move outwardly from said collar to cause the locking members to engage the rear of the panel adjacent the opening to lock the collar assembly within the opening; and means for preventing said cantilevered arms from being depressed toward each other.

5. An adaptive collar assembly as claimed in claim 4 wherein the means in said opening for receiving the projecting flanges and adapted to be engaged by the locking members comprises a web extending across said opening adjacent the top thereof and a web extending across the opening adjacent the bottom thereof.

6. An adaptive collar assembly as claimed in claim 5 wherein said web has a thickness substantially equal to the predetermined spacing of the locking members and flanges on the coupler.

7. An adaptive collar assembly as claimed in claim 4 wherein each of said first and second cantilevered arms is substantially U-shaped and extends forward of said second body portion and bends back to extend rearwardly thereof.

8. An adaptive collar assembly as claimed in claim 4 wherein the locking member on the distal end of each of said cantilevered arms is a wedge shaped detent.

9. An adaptive collar assembly as claimed in claim 8 wherein said cantilevered arms are sufficiently depressible toward each other to disengage said detents from the panel to allow withdrawal of said collar from said panel.

10. An adaptive collar assembly as claimed in claim 4 wherein said means for preventing comprises a substantially U-shaped locking member having a first pair of spaced arms, each of said first pair of spaced arms having a distal end having a third and fourth detent member thereon, and a second pair of spaced arms.

11. An adaptive collar assembly as claimed in claim 10 wherein each of said second pair of spaced arms has a distal end having a stop member thereon adapted to fit within the space between one of said cantilevered arms and said body portions.

12. An adaptive collar assembly as claimed in claim 11 wherein said stop member has a substantially tear drop shape.

13. An adaptive collar assembly as claimed in claim 11 wherein said flange means has first and second openings therein adapted to receive said third and fourth detent members.

14. An adaptive collar assembly as claimed in claim 13 wherein said first pair of spaced arms and said second pair of spaced arms are compressible toward each other to permit insertion of said stop members in said spaces and said third and fourth detent members in said openings in said flange means.

15. A patch panel assembly comprising:

a panel plate having an array of openings formed therein and front and rear faces;

an adaptive collar for mounting a component in one of said openings comprising:

a first, rear body portion sized and shaped to fit within said one of said openings;

a second, front body portion having top, bottom and side portions sized and shaped to be larger than said opening and having means forming at least one bearing surface adapted to bear against the front face of said panel plate;

a component receiving opening extending through said first and second body portions;

means in said opening forming locating and locking surfaces extending across said opening for the component;

first and second cantilevered arms extending from said second body portion at either side thereof rearwardly past said first body portion;

each of said cantilevered arms being connected to said second body portion and biased outwardly therefrom to define a space between each of said arms and said first and second body portions adjacent thereto such that when said arms are forcibly depressed toward each other said first body portion can be inserted into said opening in said panel plate until said bearing surface bears against the front face of said panel plate;

each of said cantilevered arms having a distal end having a locking member thereon for engaging the rear face of said panel plate when the depressing forces are removed from said arms to affix said collar to said panel plate; and means for preventing depression of at least one of said cantilevered arms sufficient to cause said locking member to disengage from said rear face, to maintain said collar affixed to said panel plate.

16. A patch panel assembly as claimed in claim 15 wherein said means for preventing depression of said cantilevered arms comprises a locking member having a first portion insertable in the space between said cantilevered arm and said body portions and a second portion having means thereon for locking said locking member to said collar.

17. A patch panel assembly as claimed in claim 16 wherein said locking member is substantially U-shaped and has a first pair of arms having end portions insertable in said spaces between said cantilevered arms and said body portions, and a second pair of arms having end portions connectable to said collar, said first pair of arms and said second pair of arms being compressible toward each other.

* * * * *